US009003067B2

(12) United States Patent
Barthel et al.

(10) Patent No.: US 9,003,067 B2
(45) Date of Patent: Apr. 7, 2015

(54) NETWORK AND METHOD FOR OPERATING THE NETWORK

(75) Inventors: Herbert Barthel, Herzogenaurach (DE);
Reiner Griessbaum, Rülzheim (DE);
Enrico Ramm, Chemnitz (DE)

(73) Assignee: Siemens Aktiengesellschaft, Munich (DE)

( * ) Notice: Subject to any disclaimer, the term of this patent is extended or adjusted under 35 U.S.C. 154(b) by 138 days.

(21) Appl. No.: 13/207,183

(22) Filed: Aug. 10, 2011

(65) Prior Publication Data
US 2012/0089749 A1    Apr. 12, 2012

(30) Foreign Application Priority Data
Aug. 10, 2010  (EP) ..................................... 10172378

(51) Int. Cl.
*G06F 3/00* (2006.01)
*G06F 11/20* (2006.01)
*G06F 13/40* (2006.01)

(52) U.S. Cl.
CPC ........ *G06F 11/2033* (2013.01); *G06F 13/4022* (2013.01); *G06F 11/2038* (2013.01); *G06F 11/2048* (2013.01)

(58) Field of Classification Search
CPC ............ G06F 13/4022; G06F 11/2033; G06F 11/2038
USPC ................................................. 710/37, 45, 6
See application file for complete search history.

(56) References Cited

U.S. PATENT DOCUMENTS

| | | | | |
|---|---|---|---|---|
| 6,223,230 | B1* | 4/2001 | Garnett et al. | 710/26 |
| 7,502,878 | B1* | 3/2009 | Wright | 710/37 |
| 8,086,768 | B2* | 12/2011 | Watanabe et al. | 710/38 |
| 8,117,434 | B2* | 2/2012 | Sun et al. | 713/2 |
| 2008/0178037 | A1 | 7/2008 | Hof et al. | |
| 2010/0293591 | A1* | 11/2010 | Shah | 726/1 |
| 2010/0306424 | A1* | 12/2010 | Akester | 710/36 |
| 2011/0271126 | A1* | 11/2011 | Hill | 713/320 |

FOREIGN PATENT DOCUMENTS

WO    WO 2006/033882    3/2006

* cited by examiner

*Primary Examiner* — Ernest Unelus
(74) *Attorney, Agent, or Firm* — Cozen O'Connor

(57) ABSTRACT

A method for operating a network with two control devices and at least one peripheral device, wherein each of the control devices, in relation to the peripheral device, is in an active operating state in which it is sending control instructions to the peripheral device or is in an idle operating state in which it is not sending any control instructions to the peripheral device. The control device that is in the active operating state in relation to the peripheral device sends synchronization signals at regular intervals to the other control device and activity signals to the peripheral device. Upon failure of the synchronization signals, the non-active control device checks whether the peripheral device is still receiving activity signals from the active control device. If it is not, the non-active control device assumes control of the peripheral device.

11 Claims, 3 Drawing Sheets

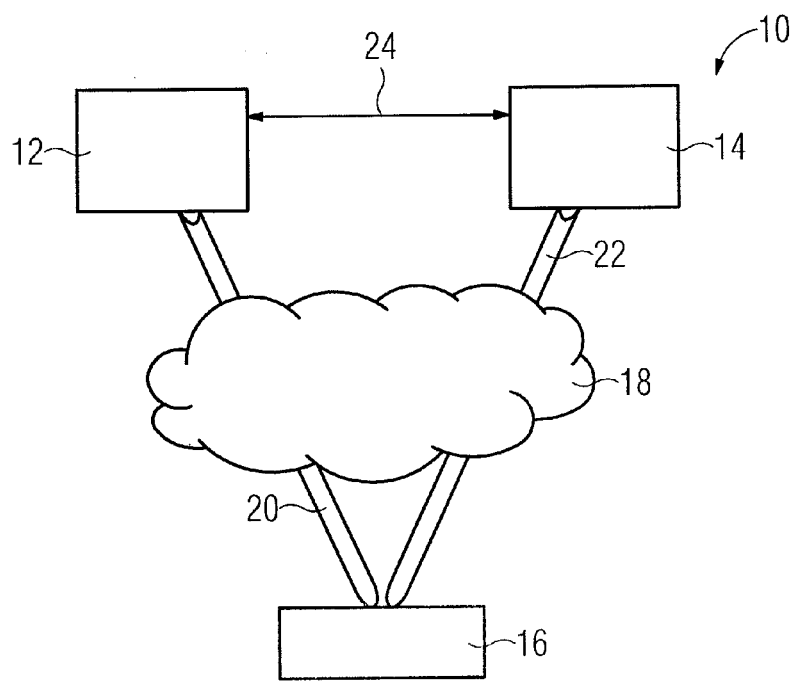
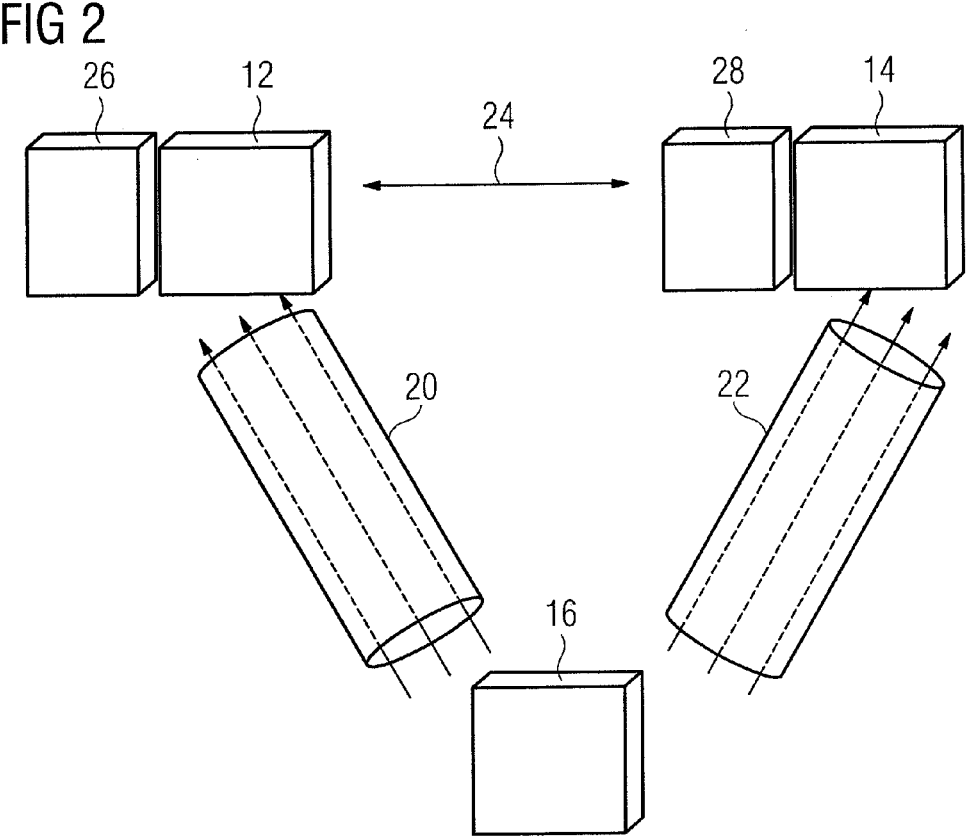

NETWORK AND METHOD FOR OPERATING THE NETWORK

BACKGROUND OF THE INVENTION

1. Field of the Invention

The invention relates to a method for operating a network having two control devices and at least one peripheral device, and also to a network of this type.

2. Description of the Related Art

Networks, which are often based on the so-called field bus standard, are used in a known manner to control factories, such as production plants. It is of special importance in such cases to ensure an especially high availability of the network and its components to avoid costly downtimes or even accidents which can result from the failure of control of the production plant. It is therefore usual to provide two redundant control devices, of which one, operating as an active control device in each case, issues control signals to the remaining components of the network, with the other in each case serving as a backup control device and only assuming control of the production plant upon failure of the first control device.

With complex plants, it is thus of importance for the backup control device also to be informed at any given time about the status of the plant, so that in the event of a main control device failure the backup control device can take over control seamlessly. For this purpose, synchronization occurs between the control devices. The backup control device can also determine from the synchronization whether the main control device is still active.

The problem that exists here however is that, in the event of a failure of synchronization between the control devices, the backup control device cannot decide whether it is actually the main control device that has failed or merely the synchronization. If the main control device is still active when synchronization has failed, the backup control device may not attempt to take over the control of the plant since otherwise conflicting control signals could be sent from the two devices to the components of the network. As a result, the network can enter an undefined state which can also lead to failure or even to damage to the production plant. It is thus usual to design redundant synchronization devices and synchronization lines between the two control devices.

The disadvantage of this is however that it increases the manufacturing overhead of a network of this type. In addition, even with a redundant synchronization line or synchronization device, it can occur that the main control device is still active while both synchronization lines or synchronization devices have failed at the same time. Here too the problem again occurs of the two control devices simultaneously attempting to take over control of the plant.

SUMMARY OF THE INVENTION

It is therefore an object of the present invention to provide a method and a network which makes possible an especially reliable and conflict-free operation of the network with a plurality of control devices.

This and other objects and advantages are achieved by a method for operating a network with two control devices and at least one peripheral device, where each of the control devices, in relation to the peripheral device, is either in an active operating state in which it is sending control instructions to the peripheral device, or is in an idle state in which it is not sending any control instructions to the peripheral device. Here each control device is always in a different operating state in relation to the peripheral device. In other words, one of the control devices always functions as a main control device with respect to the peripheral device while the other respective control device assumes a backup function. The control device that is in the active operating state in relation to the peripheral device also sends synchronization signals at regular intervals to the other control device. As a result, assurance is provided that the plurality of control devices are in the same internal state, so that on failure of the control device operating in the active operating state the other control device can seamlessly take over control of the peripheral devices.

The control device that is in the active operating state in relation to the peripheral device further sends activity signals to the peripheral device at regular intervals. The peripheral device can thus establish, independently of the other control device, whether the main control device active at the time is still operable by checking for the regular arrival of the activity signals. This can be used to avoid an undesired simultaneous activation of the two control devices. To this end, the control device that is in the idle state in relation to the peripheral device checks, when at least one of the synchronization signals is not received from the active control device within a predetermined period of time, whether the peripheral device has received an activity signal from the control device in the active operating state within a further predetermined period of time. In this way, the control device in the idle operating state can decide whether the non-receipt of the at least one synchronization signal is the result of a failure of the control device in the active operating state or merely due to a failure of synchronization between the plurality of control devices.

If it is established during this checking that the peripheral device is actually still receiving activity signals from the control device in the active operating state within the further predetermined period of time, the control device remains in its idle operating state, since the active control device is still operable and only the synchronization has failed. If however the peripheral device has not received any activity signal from the control device in the active operating state within the further predetermined period of time, the control device in the idle operating state can switch to the active operating state since it is now clear that the absence of the synchronization signals is actually a result of a failure of the control device in the active operating state. This reliably avoids both control devices switching into the active operating state at the same time, and by this action triggering conflicts in the peripheral device. At the same time, the method in accordance with the invention allows a redundant design of transmission of the synchronization signals between the control devices to be dispensed with, so that a network for performing the method in accordance with the invention can be installed at an especially low cost.

In a preferred embodiment of the method in accordance with the invention, a plurality of peripheral devices is used. In relation to a first group of peripheral devices, the first control device is in an active operating state and the second control device in an idle operating state. In relation to a second group of peripheral devices, on the other hand, the first control device is in the idle operating state and the second control device in the active operating state. In accordance with the presently contemplated embodiment of the method, one of the control devices is thus not necessarily used as the main control device for all peripheral devices, while the other control device merely serves as backup. Instead, the control of the peripheral devices is distributed between the plurality of control devices, where each control device serves as a backup for controlling those peripheral devices that are currently being controlled by the other control device. As a result, for example, the computing power of the two control devices is enabled to be utilized in an optimum manner, so that the performance of a network operated in accordance with the presently contemplated embodiment of the method is particularly good. In the event of one of the control devices failing, in the above-described manner, the control tasks that were previously assumed by the failed control device in relation to the peripheral devices controlled by the failed control device are transferred to the other control device which then controls all peripheral devices.

In a further preferred embodiment, a control device only switches from the idle operating state into the active operating state if all peripheral devices in relation to which the control device is in the idle operating state have not received any activity signal within a predetermined period of time from the control device that is in the active operating state in relation to these peripheral devices. This ensures that even if one or more peripheral devices possess incorrect information about the state of the active control device, no incorrect activation of the control device operating in the idle operating state can occur.

It can however also be expedient for one of the control devices to switch into the active operating state in relation to all peripheral devices if at least one peripheral device in relation to which the control device is in the idle operating state has not received an activity signal within the further predetermined period of time. As a result, in this way it is possible to ensure that incorrect information of further peripheral devices relating to the receipt of activity signals does not lead to a loss of control.

Preferably, the at least one peripheral device sends further signals relating to its operating state to the two control devices. This ensures that the control device that is in the idle state also possesses information about the current state of the production plant and all peripheral devices, so that in the event of a failure of the main control device it can immediately take over control without this resulting in conflicts.

Here, it is especially expedient for the control device in the idle operating state to process the peripheral devices in the same way as the control device in the active operating state. The idle operating state thus differs from the active operating state only in so far as no signals are sent to the peripheral devices in the idle operating state. Otherwise, the internal state of the two control devices matches so that no time delay occurs during the assumption of the control function by the control device in the idle operating state.

In an especially preferred embodiment, signals are transmitted between the control devices and the peripheral devices over separate lines assigned to the respective control devices. In other words, it is not only the control devices that are redundant in their design but also the lines assigned to them, i.e., the entire network. This ensures an especially high availability of the network, because in this way not only failures in a control device but failures in the line system of the network can also be compensated for.

Preferably, a field bus is used for transmission of the signals between the control devices in the at least one peripheral device. This involves a standardized Ethernet network with real-time capabilities which advantageously is especially fault-tolerant and as a result of the standardization both data lines and also the protocols used, allows cooperation between a very wide diversity of peripheral and control devices.

In a further preferred embodiment, a data line different from the field bus is used for transmission of the synchronization signals between the control devices. This ensures that the synchronization of the two control devices functions smoothly even with faults in the network or with an especially high network load.

It is further advantageous, in the event of a failure of the synchronization signals between the control devices, for a pre-specified control device provided as the main control device to switch into the active operating state in relation to all peripheral devices and for the other control device provided as backup control device to switch into the idle operating state in relation to all operating devices. This is especially useful if the synchronization of the control tasks is distributed between the control devices in the event of a failure. The distribution of all control tasks to a single control device enables the production plant to be controlled to continue to be operated without redundancy if the synchronization fails without the lack of synchronization resulting in conflicts.

The invention further relates to a network having two control devices and at least one peripheral device. Here, each of the control devices is either in an active operating state in relation to the peripheral device in which it sends control instructions to the peripheral device, or is in an idle operating state in which it does not send any control instructions to the peripheral device. Moreover, the control devices are each in different operating states in relation to the peripheral device. The control devices are also configured to send synchronization signals at regular intervals to the respective other control device, and in the active operating state to send activity signals at regular intervals to the peripheral device.

The control devices are also configured, if they do not receive at least one of the synchronization signals within a predetermined period of time from the respective other control device in the idle operating state, to perform a check to determine whether the peripheral device has received an activity signal from the control device in the active operating state within a further predetermined period of time. If the control device has not received the activity signal from the control device in the active operating state within the further predetermined period of time, the control device will switch from the idle operating state into the active operating state in relation to the peripheral device. As previously described with reference to the disclosed embodiments of the method, it can be ensured in this type of network that, in the event of a failure of the synchronization signals between the control devices, the two control devices do not simultaneously switch to the active operating state in an undesired manner. Such a network is thus especially operationally-secure and the same time highly available.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and its forms of embodiment are explained in greater detail below with reference to the drawings, in which:

FIG. 1 shows a schematic block diagram of a network for performing an exemplary method in accordance with an embodiment of an invention;

FIG. 2 shows a schematic diagram of the information flows in a network while an exemplary method in accordance with an embodiment of an invention is being performed;

DETAILED DESCRIPTION OF THE PRESENTLY PREFERRED EMBODIMENTS

Figure 3:
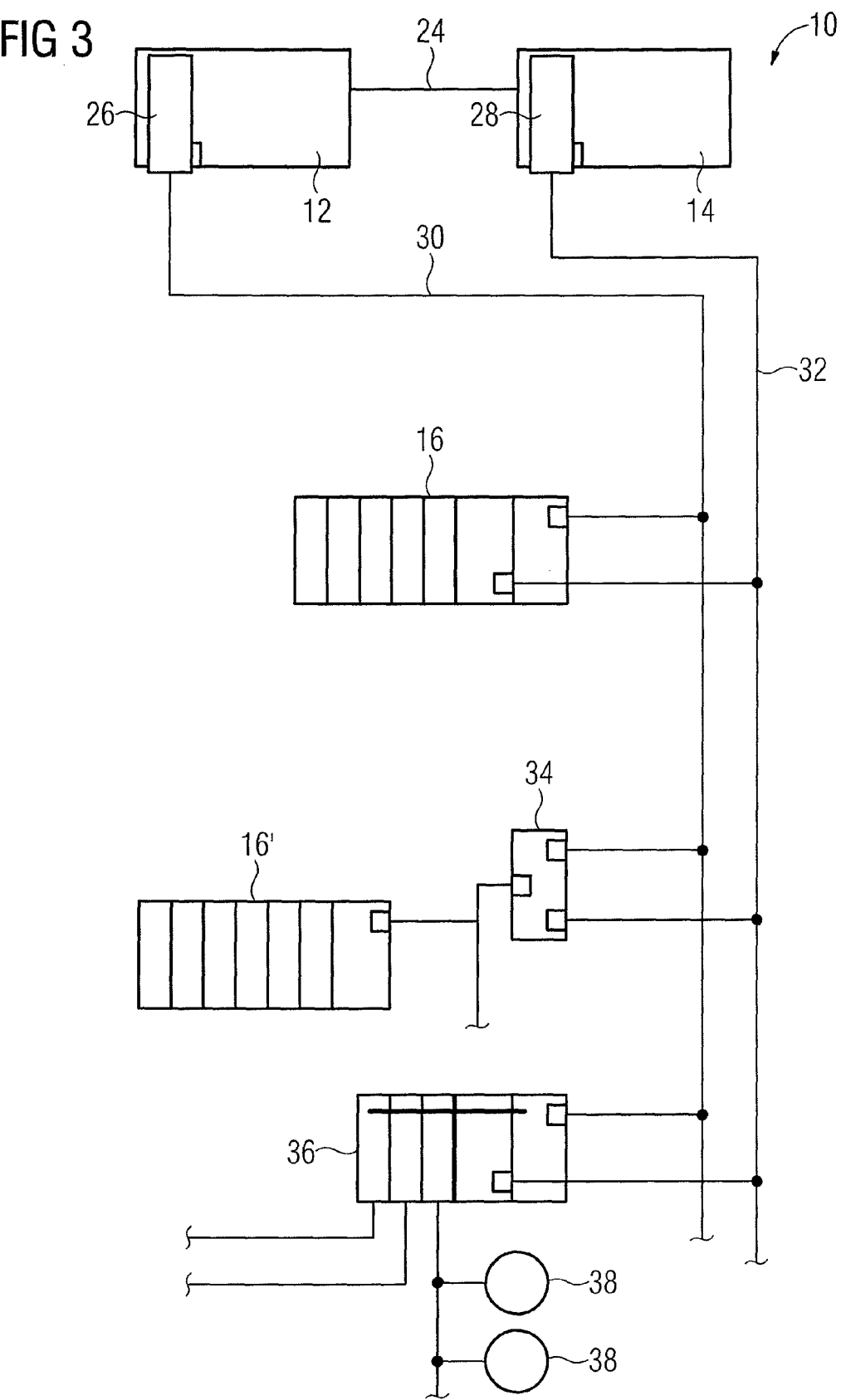
FIG. 3 shows an exemplary embodiment of an inventive network.

With reference to FIG. 1, shown herein is a high-availability network for industrial automation (identified overall by the number 10) with two programmable logic controllers or control devices/units 12, 14 that are used to control a peripheral device 16. Here, the control device 12 is in an active operating state, i.e., control device 12 serves as a master, while the control device 14 assumes a backup function in an idle state. The active control unit 12 communicates over the network connections 18 only shown schematically in the diagram through a logical connection 20 with the peripheral device 16 and sends control signals to the peripheral device 16. In the opposite direction, the active control unit 12 receives status information from the peripheral device 16.

The backup control unit 14 is likewise connected through a logical connection 22 to the peripheral device 16 but does not send any control signals to the peripheral device 16. Instead, backup control unit 14 likewise receives status information from the peripheral device 16. The backup control unit 14 is configured, in the event of the failure of the active control unit 12, to take over the control of the peripheral device 16.

So that the control function can be transferred between the control units 12, 14 in a seamless manner, the control units 12, 14 are connected to each other through a synchronization connection 24. This ensures that the control unit 14 is in the same internal operating state at all times as the active control unit 12. The operating state of the control unit 14 only differs from the operating state of the control unit 12 in that the control unit 14 does not issue any control signals to the peripheral device. The synchronization between the control units 12, 14 can be undertaken in such cases through methods that are known per se for event synchronization, clock synchronization or cycle synchronization.

If the control unit 14 is no longer receiving synchronization signals from the active control unit 12, it is initially not clear whether the control unit 12 has actually failed, or whether it is merely the synchronization connection 24 that is faulty. In the latter case, however, the backup control unit 14 may not assume the control function, because in this case the two control units 12, 14 would actively send control signals to the peripheral device 16. This can result in conflicts and undefined states in the network 10 or in the peripheral device 16 that could potentially damage a production plant to be controlled.

In order to avoid such conflicts and undefined states in the network 10 or in the peripheral device 16, as shown in FIG. 2, additional signals are exchanged between the control units 12, 14 and the peripheral device 16. The active control unit 12 sends activity signals over its network interface 26 over the logical connection 20 at regular intervals to the peripheral device 16. On receipt of these activity signals, the peripheral device 16 sets a status bit (Primary Present) that indicates that the control device 12 is still active. In the initial assumption of control of the peripheral device 16 by the control device 12, a further status bit (self Primary) is also set that indicates that the peripheral device 16 is now assigned to the control device 12. During normal operation, control signals of the control device 12 and status information of the peripheral device 16 are transmitted over the logical connection 20 between the control device 12 and the peripheral device 16 so that the peripheral device 16 performs the desired functions.

The control device 14 remains in its backup state until such time as it is no longer receiving synchronization signals from the active control device 12. A check must now be made to determine whether the active control device 12 has actually failed or whether the synchronization connection 24 is merely no longer functioning. To this end, the control device 14 now checks, for all peripheral devices 16, whether the Primary Present bit is still set. If this bit is not set, the backup control device 14 knows that it is in fact the active control device 12 and not the synchronization connection 24 that has failed. The control device 14 now becomes the main control device, and assumes control of the peripheral device 16. At the same time, the control device 14 sets the self Primary bit assigned to it in the peripheral device 16, so that the peripheral device 16 now knows that it is assigned the control device 14. The control device 14 now regularly sends activity signals to the peripheral device 16 so that the peripheral device 16 resets its Primary Present bit, and the normal operation of the network in relation to the control of the peripheral device 16 is re-established.

FIG. 3 shows a schematic diagram of a network for performing the method in accordance with an embodiment of the invention. Here, the control device 12 and the control device 14 in this network 10 are each connected by their network controllers 26, 28 to their own field bus lines 30, 32, which in their turn are connected to the directly connected peripheral device 16 which is controlled in the above-described manner.

In addition to the peripheral device 16 linked directly to the field bus lines 30, 32, a further peripheral device 16' is present which is connected indirectly by a Y switch 34 to the field bus lines 30, 32. The connection of the peripheral device 16' is thus not redundant, only the switch is connected redundantly and is likewise controlled in the above-described manner. The signals from the field bus lines 30, 32 can finally also be transmitted by a converter 36 to further non-redundant peripheral devices 38. Depending on the demands on the availability of peripheral devices, these can thus be connected directly or indirectly to the field bus lines 30, 32. For indirect linkage the embodiments of the disclosed method described are performed at the level of the switches 34, 36 which transmit the control signals to the non-redundantly linked control devices 16' and 38.

Figure 4:
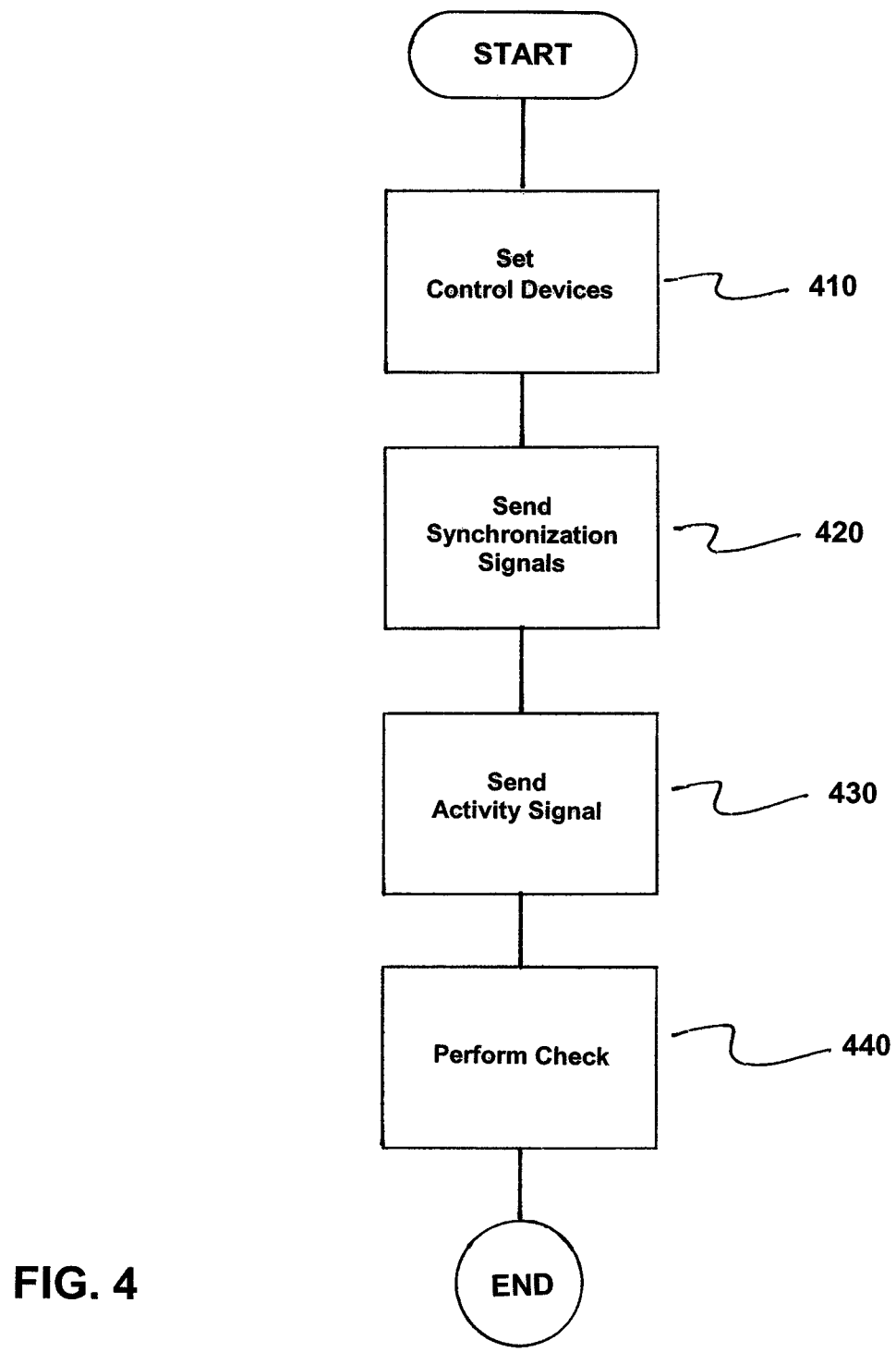
FIG. 4 is a flow chart of a method in accordance with an embodiment of the invention.

FIG. 4 is a flow chart of a method for operating a network 10 with two control devices 12, 14 and at least one peripheral device 16. The method comprises setting, in relation to the at least one peripheral device 16, each of the control devices 12, 14 to either an active operating state in which each control device sends control instructions to the at least one peripheral device 16 or to an idle operating state in which each control device is not sending any control instructions to the at least one peripheral device 16, as indicated in step 410. Here, the control devices 12, 14 always are in different operating states in relation to the at least one peripheral device 16.

A control device 12, which is in the active operating state in relation to the at least one peripheral device 16, sends synchronization signals at regular intervals to the other control device 14, as indicated in step 420.

Activity signals are sent from the control device 12 which is in the active operating state in relation to the peripheral device 16 at regular intervals to the at least one peripheral device 16, as indicated in step 430.

A check is performed at the other of the control devices 14, which is in the idle operating state in relation to the at least one peripheral device 16, to determine whether the at least one peripheral device 16 has received an activity signal from the control device in the active operating state within a predetermined period of time if the other of the control devices 14, which is in the idle operating state in relation to the at least one peripheral device 16, has not received at least one of the synchronization signals within a predetermined period of time from the control device 12, which is in the active operating state in relation to the at least one peripheral device 16. If the other of the control devices 14 which is in the idle operating state in relation to the at least one peripheral device 16 has not received an activity signal from the control device 12 in the active operating state within a predetermined period of time, the switching the control device 14 from the idle operating state into the active operating state in relation to the at least one peripheral device 16, as indicated in step 440.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating a network with two industrial programmable logic controllers (PLC) and at least one peripheral device, the method comprising:
    setting in relation to the at least one peripheral device, a first industrial PLC of the two industrial PLCs to an active operating state in which the first industrial PLC sends control instructions to the at least one peripheral device and setting a second industrial PLC of the two industrial PLCs to an idle operating state in which the second industrial PLC is not sending any control instructions to the at least one peripheral device, the two industrial PLCs being directly connected to each other via a synchronization connection which ensures the two industrial PLCs are in the same internal state at all times and always being in different operating states in relation to the at least one peripheral device;
    sending from the first industrial PLC which is in the active operating state in relation to the at least one peripheral device synchronization signals at regular intervals to the second industrial PLC;
    sending from the first industrial PLC activity signals at regular intervals to the at least one peripheral device; and
    performing, at the second industrial PLC, which is in the idle operating state in relation to the at least one peripheral device, a check to determine whether the at least one peripheral device has received an activity signal from the first industrial PLC within a predetermined period of time if the second industrial PLC has not received at least one of the synchronization signals within another predetermined period of time from the first industrial PLC and, if the second industrial PLC has not received an activity signal from the first industrial PLC within the predetermined period of time, switching the second industrial PLC from the idle operating state into the active operating state in relation to the at least one peripheral device.

2. The method as claimed in claim 1, wherein a plurality of peripheral devices is provided, whereby the first industrial PLC is in the active operating state and the second industrial PLC is in the idle operating state in relation to a first group of the peripheral devices and the first industrial PLC is in the idle operating state and the second industrial PLC is in the active operating state in relation to a second group of the peripheral devices.

3. The method as claimed in claim 2, further comprising:
    switching the one of the first and second industrial PLCs from the idle operating state into the active operating state only when all peripheral devices in the one of the first and second groups for which the one of the first and second industrial PLCs is in the idle operating state have not received any activity signal within the predetermined period of time from the other of the first and second industrial PLCs which is in the active operating state in relation to the one of the first and second groups.

4. The method as claimed in claim 2, further comprising:
    switching one of the first and second industrial PLCs from the idle operating state into the active operating state in relation to all peripheral devices when at least one peripheral device of the one of the first and second groups for which the one of the first and second industrial PLCs is in the idle operating state has not received any activity signal within the predetermined time period from the other of the first and second industrial PLCs, which is in the active operating state in relation to the one of the first and second groups.

5. The method as claimed in claim 1, wherein the at least one peripheral device sends signals relating to the operating state of the at least one peripheral device to the two industrial PLCs.

6. The method as claimed in claim 5, wherein the second control device in the idle operating state in relation to the at least one peripheral device processes the signals of the plurality of peripheral devices in a same way as the first industrial PLC.

7. The method as claimed in claim 2, wherein signals are transmitted between the two industrial PLCs and the at least one peripheral device over separate lines respectively assigned to the first and second industrial PLCs.

8. The method as claimed in claim 1, wherein signals are transmitted over a field bus between the two industrial PLCs and the at least one peripheral device.

9. The method as claimed in claim 1, wherein the synchronization signals are transmitted between the two industrial PLCs over a data line differing from a field bus.

10. The method as claimed in claim 1, wherein, if at least one synchronization signal is not received by the second industrial PLC, which is in the idle operating state in relation to one of the peripheral devices of the first group, and if activity signals are received at the same time by the one of the peripheral device of the first group from the first industrial PLC, which is in the active operating state in relation to the one of the peripheral devices of the first group, then a predetermined one of the first and second industrial PLCs switches into the active operating state in relation to all of the peripheral devices and the other of the first and second industrial PLCs switches into the idle operating state in relation to all of the peripheral devices.

11. A network comprising:
two industrial programmable logic controllers (PLC) directly interconnected via a synchronization connection; and
at least one peripheral device, the synchronization connection ensuring the two industrial PLCs are in the same internal state at all times;
wherein in relation to the at least one peripheral device, each of the industrial PLCs is in either an active operating state in which control instructions are sent to the peripheral device or in an idle operating state in which control instructions are not sent to the at least one peripheral device;
wherein the two industrial PLCs are always in different operating states in relation to the at least one peripheral device;
wherein each of the two industrial PLCs is configured to send synchronization signals at regular intervals in the active operating state to the other industrial PLC;
wherein each of the two industrial PLCs is configured to send activity signals at regular intervals in the active operating state to the at least one peripheral device; and
wherein each of the two industrial PLCs is configured to, if at least one of the synchronization signals within a predetermined period of time from the other industrial PLC is not received in the idle operating state, perform a check to determine whether the at least one peripheral device has received an activity signal from the industrial PLC in the active operating state within a further predetermined period of time and, if an activity signal is not received from the industrial PLC in the active operating state within the further predetermined period of time, switch from the idle operating state into the active operating state in relation to the at least one peripheral device.

* * * * *